US009154460B1

(12) United States Patent
Bharrat et al.

(10) Patent No.: US 9,154,460 B1
(45) Date of Patent: Oct. 6, 2015

(54) METHODS AND APPARATUS FOR DENIAL OF SERVICE RESISTANT POLICING OF PACKETS

(71) Applicant: Sonus Networks, Inc., Westford, MA (US)

(72) Inventors: Shaun Jaikarran Bharrat, Manalapan, NJ (US); Shiping Li, Acton, MA (US)

(73) Assignee: SONUS NETWORKS, INC., Westford, MA (US)

( * ) Notice: Subject to any disclaimer, the term of this patent is extended or adjusted under 35 U.S.C. 154(b) by 0 days.

(21) Appl. No.: 14/179,248

(22) Filed: Feb. 12, 2014

(51) Int. Cl.
*H04L 29/06* (2006.01)

(52) U.S. Cl.
CPC .................................. *H04L 63/0227* (2013.01)

(58) Field of Classification Search
CPC .................................................. H04L 63/0227
See application file for complete search history.

(56) References Cited

U.S. PATENT DOCUMENTS

| 5,115,432 | A * | 5/1992 | Haas | 370/469 |
| 5,764,789 | A * | 6/1998 | Pare et al. | 382/115 |
| 6,424,625 | B1 * | 7/2002 | Larsson et al. | 370/236 |
| 7,746,781 | B1 * | 6/2010 | Xiang | 370/235 |
| 7,990,861 | B1 * | 8/2011 | Jin et al. | 370/231 |
| 2005/0216954 | A1 * | 9/2005 | Ramaiah et al. | 726/22 |
| 2009/0094691 | A1 * | 4/2009 | Dargis | 726/11 |
| 2011/0173490 | A1 * | 7/2011 | Narayanaswamy et al. | 714/4.11 |
| 2012/0272309 | A1 * | 10/2012 | Zhang et al. | 726/13 |
| 2014/0071822 | A1 * | 3/2014 | Rochon | 370/230.1 |

OTHER PUBLICATIONS

P. Vern. "Automated Packet Trace Analysis of TCP Implementations" SIGCOMM. pp. 167-179. 1997.*

* cited by examiner

*Primary Examiner* — Mohammad L Rahman
(74) *Attorney, Agent, or Firm* — Stephen T. Straub; Ronald P. Straub; Michael P. Straub

(57) ABSTRACT

Methods and apparatus for supporting secure packet communications, e.g., sRTP/sRTCP, which are resistant to denial of service attacks are described. A received packet is identified to correspond to a particular stream being received, the stream having a current expected set of packet sequence numbers, e.g., a current window including a next expected packet sequence number and at least one packet sequence number in the expected packet window on each side of the expected packet sequence number. Unencrypted information from the received packet, e.g., a received packet sequence number, is used to determine at least one of: to drop the received packet, or to assign the packet to one of a plurality of policing levels. If the packet passes policing at its assigned policing level, the packet may undergo authentication and decryption to determine if it is a valid packet.

15 Claims, 12 Drawing Sheets

METHODS AND APPARATUS FOR DENIAL OF SERVICE RESISTANT POLICING OF PACKETS

FIELD

Various embodiments relate to packet communications and more particularly, to denial of service resistant policing of packets.

BACKGROUND

Denial of service attacks have been going up rapidly as low cost bandwidth becomes more readily available to more people, and the potential for a successful denial of service attack causing disruption has been increasing. In the past, more computing power could simply be added to a session border controller, e.g., to successfully filter out the hostile attack packets, via processing intensive authentication, decryption, and/or validation operations, thus allowing the valid packets to be passed without significant disruption. However, computing power is not keeping pace with the increased level of attack activity, and new approaches are needed to avoid denial of service disruptions. In addition, adding computing power, which is only needed at times of a denial of service attack, can be costly.

Providing confidentiality and/or authentication of media streams, e.g. Real-Time Transport Protocol (RTP) streams, e.g., using Secure RTP (sRTP) and/or other secure protocols which use encryption and/or other security measures, tends to be several times as costly in terms of processor power that is required than basic media stream processing, e.g. basic RTP processing. This is because decrypting and/or encrypting are processor intensive operations as compared to reading and processing unencrypted data.

The relatively high amount of processing power required to decrypt encrypted or otherwise secured packet content introduces a fundamental mismatch when designing DOS-resistant media processing. In addition, many security protocols have an authentication operation in addition to the decrypt operation, and the authentication operation can also be computationally intensive and/or introduce time delays. To fully protect against DOS, the session border controller (SBC) must be able to differentiate good packets from bad packets at line rate. For sRTP packets, the cost of this is several times the cost of doing this for non-sRTP packets. Consequently, if a design incorporates sufficient power to completely decode sRTP at line rate it is likely that such a system will waste significant processing power when not under attack.

In view of the above, there is a need for new methods and apparatus for supporting Secure Real-Time Transport Protocol (sRTP) and Secure Real-Time Transport Control Protocol (sRTCP), and/or other secure protocols with denial of service resistance but preferably without requiring authenticating, decrypting and/or decoding of all packets that are received.

SUMMARY

Various embodiments are directed to supporting confidentiality and authentication of media streams using secure communications, e.g., Secure Real-time Transport Protocol/Secure Real-time Transport Control Protocol (sRTP/sRTCP), with denial-of-service (DOS) resistance.

The methods and apparatus take into consideration information which can be reviewed and evaluated without having to perform decryption and/or decoding of packet payloads. As should be appreciated, decryption generally relates to security and/or security related encryption, while decoding tends to relate to coding performed for data compression and/or error detection/correction purposes. Packet payloads for which there is sufficient bandwidth to pass and are likely to be valid packets are then decrypted before being passed, e.g., forwarded or subject to other processing, prior to being communicated towards the intended destination.

In some embodiments the processing power which is used to support security and/or resistance to DOS attacks is approximately proportional to the expected secure packet communications rate, e.g., the expected sRTP rate. Thus, processing power required to fully decode all packets received during a DOS attack is avoided.

Note that this processing power can be significantly less than the sRTP processing power for line rate because the expected valid sRTP packet rate is a fraction of the total possible line rate on the ingress Network Interface Cards (NICs).

As part of some exemplary embodiments an expected arrival window is used with the expected arrival window including packet sequence numbers or time stamps both preceding and subsequent to an expected packet sequence number or time stamp.

Packets are subject to different levels of policing depending on where they fall in the packet sequence relative to the location of the expected packet in the expected packet window. Repeat packets corresponding to previously passed packets which were determined to be valid are dropped.

Packets assigned to different policing levels may be dropped depending on the resources available for transmitting packets corresponding to the policing level to which the packet is assigned.

In some embodiments at least some resources are reserved for communicating packets assigned to the highest priority level.

Packets, which are not dropped by the policing or checks with regard to repeat packets or other security checks which obviate packet decryption, are decrypted and the content of the packet checked to determine if it consistent with an expected packet content for the particular type of stream to which the security method is applied.

In a DOS attack it is expected that many packets will be dropped by one or more of the packet checks/policing policies prior to decryption. As a result the decryption is applied to a subset of packets, i.e., packets which are most likely to be valid and which are likely to be passed. Since the number of packets which much be decrypted during a DOS attack is likely to remain close to the expected valid line rate, albeit somewhat higher than the expected line rate of valid packets, the amount of processing resources needed to police sRTP and/or other secure packet streams need not be orders of magnitude higher than that required during periods of time in which DOS attacks do not occur.

An exemplary communications method, in accordance with some embodiments, includes receiving a packet including a packet sequence number; and determining whether to pass or drop said packet based on said packet sequence number and an expected range of packet sequence numbers, e.g., an expected window, said expected range of packet sequence numbers including a next expected packet sequence number, at least a preceding packet sequence number and at least a subsequent packet sequence number, said preceding packet sequence number preceding said next expected packet sequence number in said expected range of packet sequence number, said subsequent packet sequence number following said next expected packet sequence number in said expected range of packet sequence numbers. In some embodiments, the expected range of packet sequence numbers corresponding to a window centered or defined by said next expected packet sequence number.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

A feature of various embodiments of the present invention is to incorporate rate policing into the sRTP packet processing. Consider the approach shown in drawing 100 of FIG. 1. In step 101, a session border controller (SBC) receives a packet. Operation proceeds from step 101 to step 102. In step 102 the session border controller finds content, e.g., identifies a stream corresponding to the received packet being processed. Operation proceeds from step 102 to step 104, in which the session border controller applies policing. Different streams may be, and sometimes are, policed at different rates. Operation proceeds from step 104 to step 106, in which the session border controller determines whether or not the rate has been exceeded. If the rate has been exceeded, then operation proceeds to step 110 in which the SBC drops the received packet. However, if the rate has not been exceeded, then operation proceeds from step 106 to step 108, in which the session border controller authenticates and decrypts the received packet. Operation proceeds from step 108 to step 112. If the packet is determined to be valid based on the authentication and decryption processing, then operation proceeds from step 112 to step 114, in which the SBC performs post-decrypt processing. If the packet is not valid, then operation proceeds from step 112 to step 116, in which the SBC drops the packet.

Figure 1:
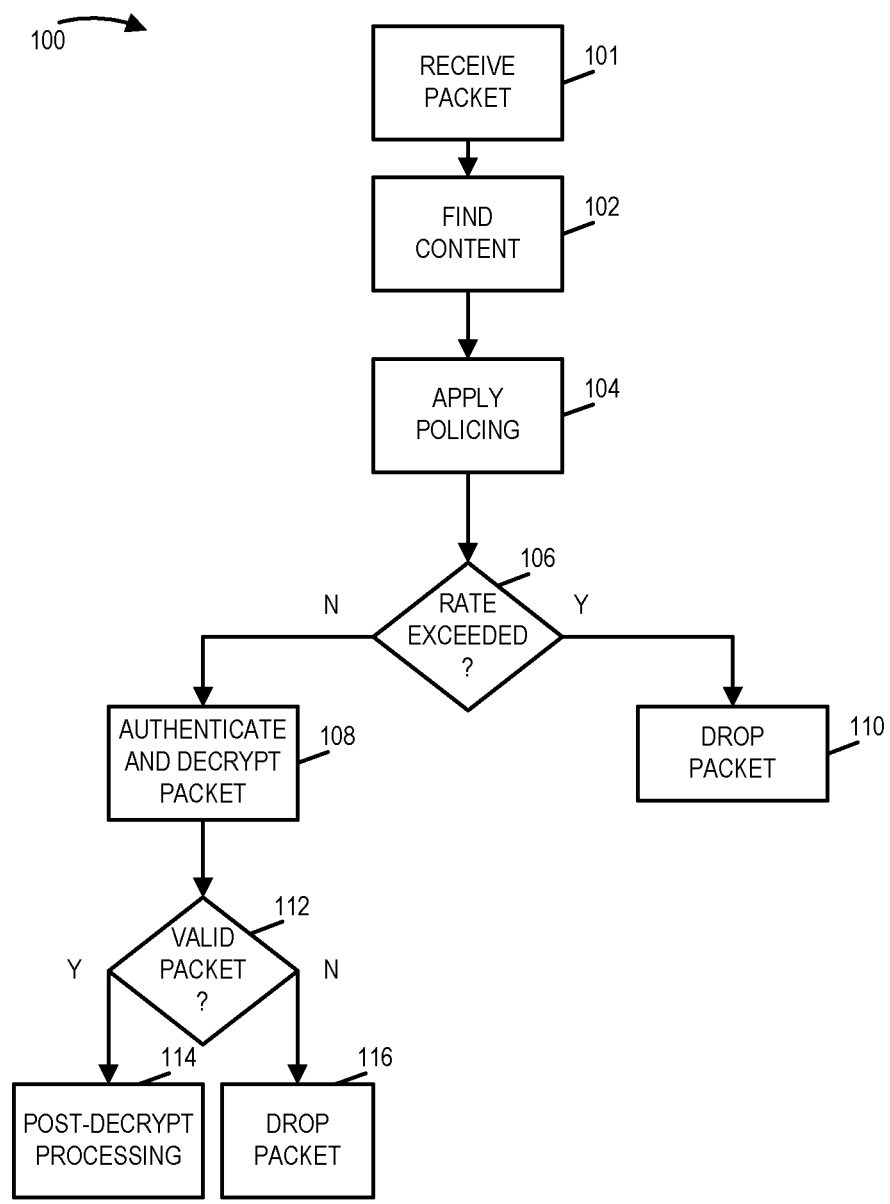
FIG. 1 is a drawing illustrating an approach of incorporating rate policing into secure packet processing in accordance with an exemplary embodiment.

This approach in FIG. 1 can be used to provide protection to the system. By appropriate sizing of the policing for each stream, the packet rate reaching the authenticator/decryptor can be controlled to the point that the authenticator/decryptor module can keep pace with the incoming packets. However, this approach is not DOS-resistant. Consider the situation where there exists a valid sRTP stream. Assume an attacker has randomly selected this context which includes the source/destination IP address and source/destination UDP port number. In practice, the attacker may spray attack packets across lots of addressing combinations and thus randomly affect multiple existing contexts. The policer could be set at approximately the rate expected from the valid peer plus some small overage. As the policer cannot distinguish attack packets from valid packets, it passes valid packets in the ratio of valid packets to total packets. Hence, if the attacker sends 1% of the policer rate, then the valid stream will suffer 1% drop rate. If the attacker increases to 5% of the policer rate, then the valid stream will suffer a 5% drop rate. Note that an sRTP packet loss exceeding 1% is generally considered as impaired service, and packet loss exceeding 3% is considered unacceptable. Hence, all an attacker needs to cause DOS on a stream is to send bad packets at a rate of 3% of the valid packet rate, which for a codec with 20 ms packetization time translates to a mere 2 bad packets/sec.

One path to a workable system, which is DOS resistant, includes integration of the policing with the sRTP/sRTCP authentication and decryption processing. An exemplary flow is as described in flowchart 200 of FIG. 2.

Figure 2A:
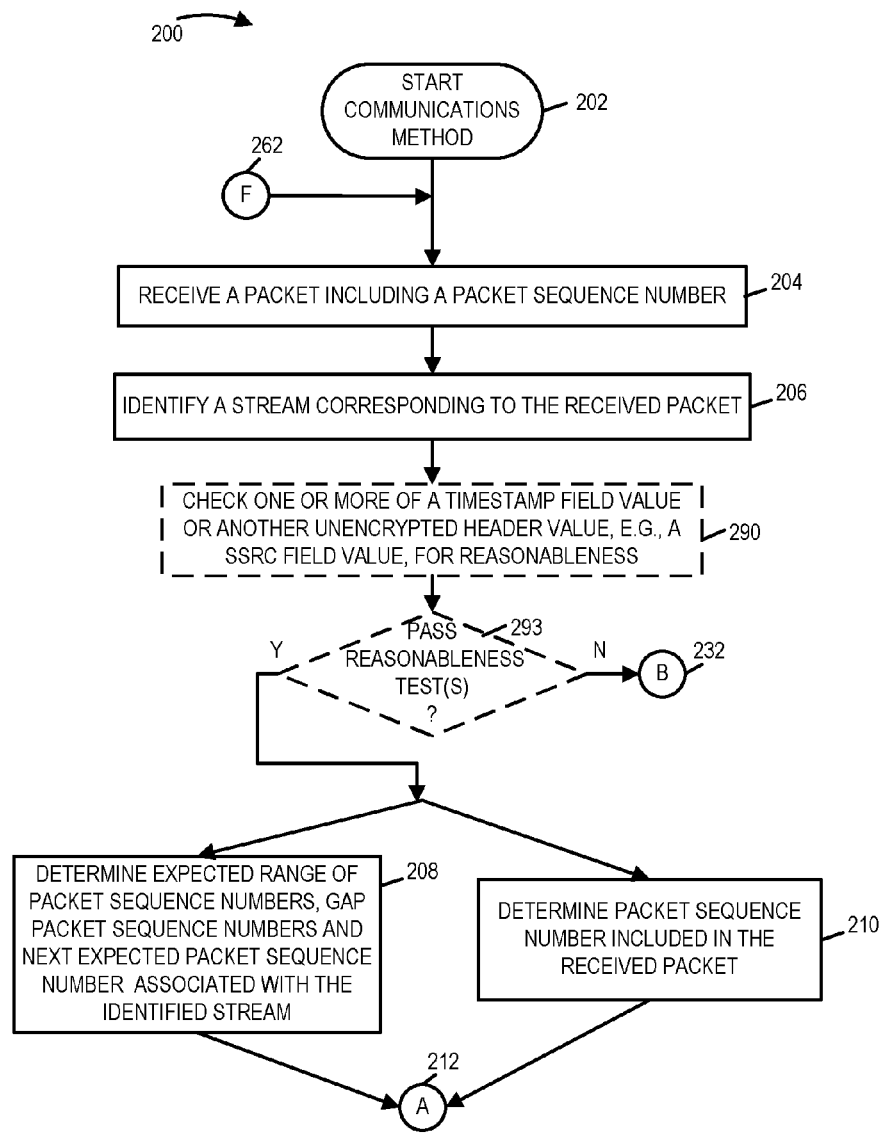
FIG. 2A is a first part of a flowchart of an exemplary communications method, supporting DOS-resistant secure packet communications, in accordance with an exemplary embodiment.
Figure 2A:
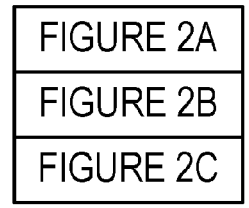
Figure 2B:
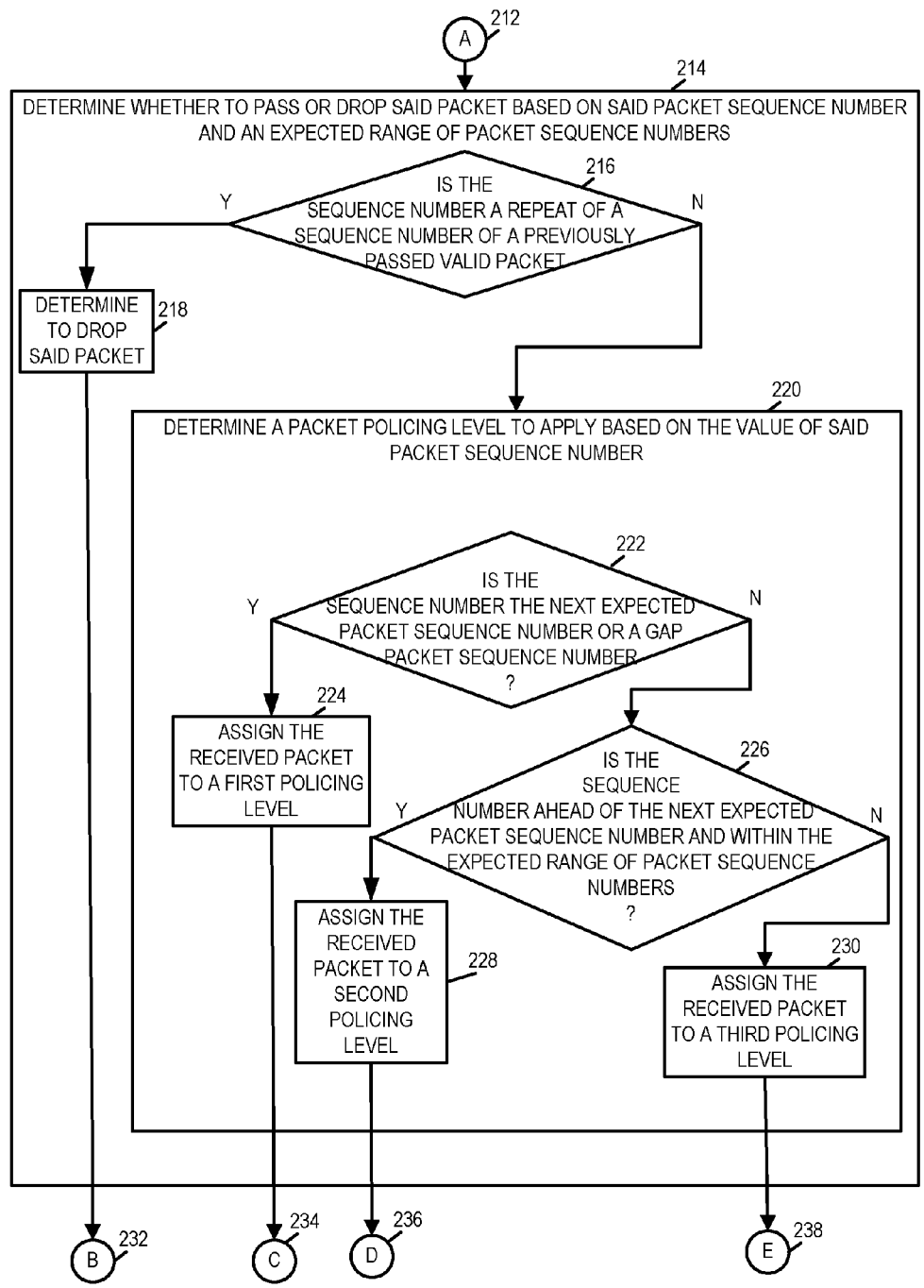
FIG. 2B is a second part of a flowchart of an exemplary communications method in accordance with an exemplary embodiment.
Figure 2C:
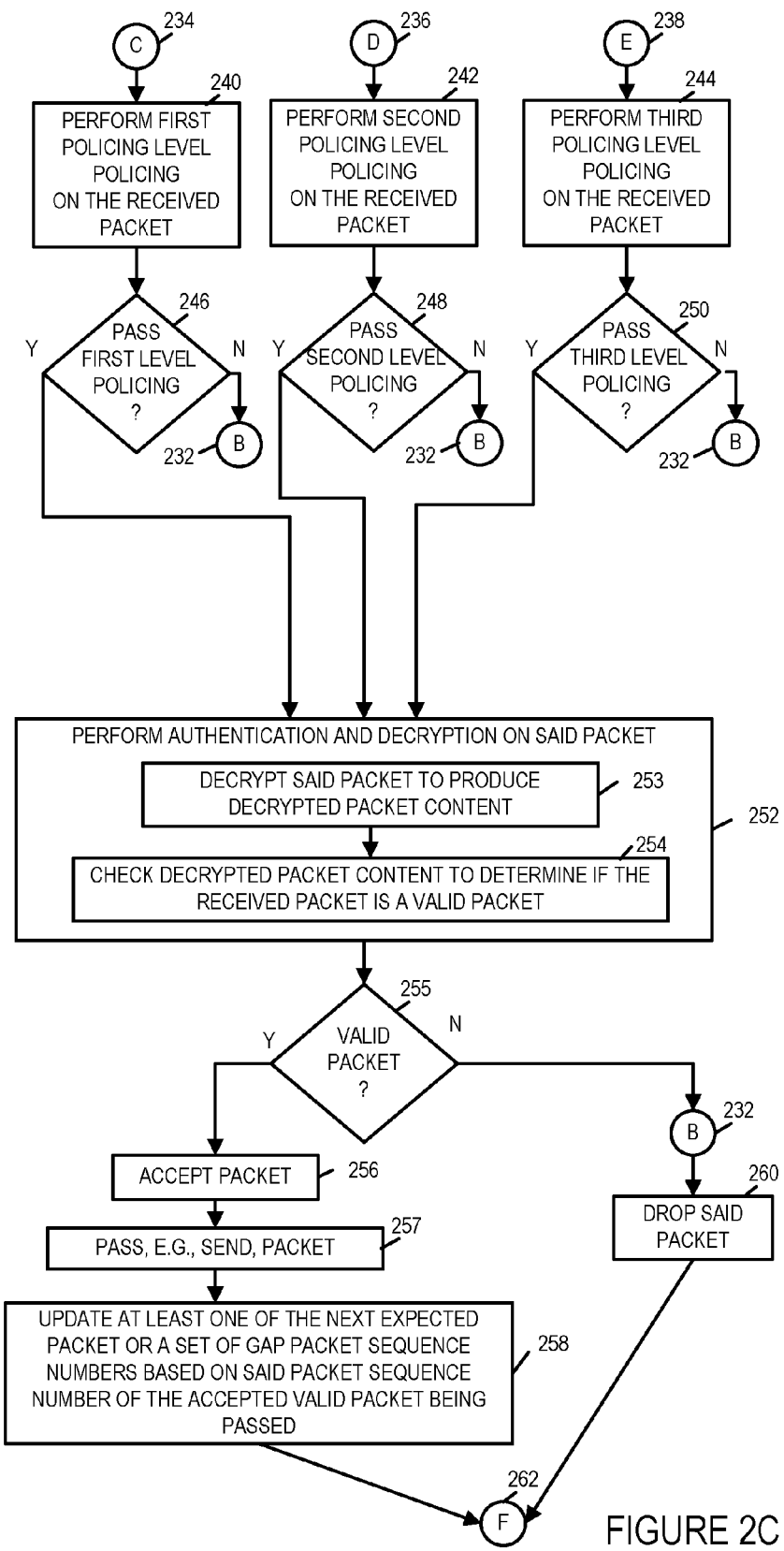
FIG. 2C is a third part of a flowchart of an exemplary communications method in accordance with an exemplary embodiment.

FIG. 2, comprising the combination of FIG. 2A, FIG. 2B and FIG. 2C, is a flowchart 200 of an exemplary communications method in accordance with an exemplary embodiment. The exemplary method of flowchart 200 may be, and sometimes is, performed by an exemplary session border controller (SBC) 400 of FIG. 4, implemented in accordance with an exemplary embodiment.

Operation starts in start step 202 and proceeds to step 204, in which the session border controller receives a packet, e.g., an sRTP or an sRTCP packet, including a packet sequence number. Operation proceeds from step 204 to step 206. In step 206, the session border controller identifies a stream corresponding to the received packet. In some embodiments, the destination IP address, the Virtual Local Area Network (VLAN) tag, and the User Datagram Protocol (UDP) port number are used in combination to identify the stream. In some embodiments, the source IP address and source port number are further used to identify stream. In some embodiments, operation proceeds from step 206 to steps 208 and 210. In some other embodiments, operation proceeds from step 206 to step 290.

In some embodiments, optional steps 290 and 293 are performed. In step 290 the session border controller checks one more of a timestamp field value or another unencrypted header value, e.g., a Synchronization Source (SSRC) field value, for reasonableness. A reasonableness check is, e.g., a range check. In some embodiments, both the timestamp field value included in the received packet and the another unencrypted header value, e.g., the SSRC field value, included in the received packet are tested for reasonableness. Operation proceeds from step 290 to step 293. In step 293, if one of the reasonableness checks performed in step 290 fails then operation proceeds from step 293, via connecting node B 232, to step 260, in which the SBC drops the received packet. However, if the reasonableness check or checks performed in step 290 pass, then operation proceeds from step 293 to steps 208 and 210.

In step 208 the session border controller determines: an expected range of packet sequence numbers, e.g., a window, gap packet sequence numbers, and a next expected packet sequence number, associated with the identified stream. In some embodiments, the determination of step 208 includes retrieving a set of stored information corresponding to the identified stream. In various embodiments, the stored information corresponding to the stream is updated, e.g., on an ongoing basis as received packets are processed and determined to be valid. In step 210 the session border controller determines the packet sequence number included in the received packet. Step 208 and 210 may be performed in parallel or sequentially.

Operation proceeds from step 208 and 210, via connecting node A 212, to step 214. In step 214 the session border controller determines whether to pass or drop the received packet based on said packet sequence number and an expected range of packet sequence numbers, the expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers. In some embodiments, the expected range of packet sequence numbers is, e.g., a range of numbers corresponding to a window centered or defined by the next expected packet sequence number. Step 214 includes steps 216, 218, and 220.

In step 216 the session border controller determines if the sequence number in the received packet is a repeat of a sequence number of previously passed valid packet. If the session border controller determines that the sequence number in the received packet is a repeat of a sequence number of a previously passed valid packet, then operation proceeds from step 216 to step 218 in which the session border controller determines to drop the received packet. However, if the session border controller determines that the sequence number in the received packet is not a repeat of a sequence number of a previously passed valid packet, then operation proceeds from step 216 to step 220.

In step 220, the session border controller determines a packet policing level to apply based on the value of said packet sequence number in the received packet. In some embodiments, different policing levels correspond to different levels of bandwidth. Step 220 includes steps 222, 224, 226, 228, and 230. In step 222 the session border controller determines if the sequence number in the received packet is the next expected packet sequence number or a gap packet sequence number, said gap packet sequence number being a packet sequence number within the range of expected packet sequence numbers for which a valid packet has not yet been passed, said gap packet sequence number being behind, e.g., preceding, said next expected packet sequence number. If the session border controller determines that the sequence number in the received packet is the next expected packet sequence number or a gap packet sequence number, then operation proceeds from step 222 to step 224 in which the session border controller assigns the received packet to a first policing level. However, if the session border controller determines that the sequence number in the received packet is not the next expected packet sequence number and is not a gap packet sequence number, then operation proceeds from step 222 to step 226.

In step 226, the session border controller determines whether or not the sequence number in the received packet is ahead of the next expected sequence number and within the expected range of packet sequence numbers. If the session border controller determines that the sequence number in the received packet is ahead of the next expected packet and is with the expected range of packet sequence numbers, then operation proceeds from step 226 to step 228 in which the session border controller assigns the received packet to a second policing level; otherwise, operation proceeds from step 226 to step 230 in which the session border controller assigns the received packet to a third policing level. Thus the received packet is assigned to the third policing level when the sequence number in the received packet is behind the next expected sequence number and is outside the expected range of packet sequence numbers or when the sequence number in the received packet is ahead of the next expected packet sequence number and is outside the expected range of packet sequence numbers.

In one exemplary embodiment, first level policing is referred to as level 0 policing; second level policing is referred to as level 1 policing; and third level policing is referred to as level 2 policing. In some embodiments, the lowest level policing, e.g., level 0 policing, corresponds to Priority 0, the highest priority, and corresponds to the highest priority packets; the mid-level policing, e.g., level 1 policing, corresponds to Priority 1, the middle priority, and corresponds to medium priority packets; and the highest level policing, e.g., level 2 policing, corresponds to Priority 2, the lowest priority, and corresponds to the low priority packets. Level 0 policing is the least restrictive, and most likely to pass a packet.

Returning to step 218, operation proceeds from step 218, via connecting node B 232, to step 260 in which the session border controller drops the received packet.

Returning to step 224, operation proceeds from step 224, via connecting node C 234, to step 240. In step 240 the session border controller performs first policing level policing on the received packet. Operation proceeds from step 240 to step 246. In step 246 the session border controller determines whether or not the received packet has passed the first level policing of step 240. If the received packet has passed the first level policing then operation proceeds from step 246 to step 252; otherwise, operation proceeds from step 246, via connecting node B 232, to step 260 in which the session border controller drops the received packet.

Returning to step 228, operation proceeds from step 228, via connecting node D 236, to step 242. In step 242 the session border controller performs second policing level policing on the received packet. Operation proceeds from step 242 to step 248. In step 248 the session border controller determines whether or not the received packet has passed the second level policing of step 242. If the received packet has passed the second level policing, then operation proceeds from step 248 to step 252; otherwise, operation proceeds from step 248, via connecting node B 232 to step 260 in which the session border controller drops the received packet.

Returning to step 230, operation proceeds from step 230, via connecting node E 238, to step 244. In step 244 the session border controller performs third policing level policing on the received packet. Operation proceeds from step 244 to step 250. In step 250 the session border controller determines whether or not the received packet has passed the third level policing of step 244. If the received packet has passed the third level policing then operation proceeds from step 250 to step 252; otherwise, operation proceeds from step 250, via connecting node B 232, to step 260 in which the session border controller drops the received packet. Thus, if a packet fails a policing policy corresponding to the determined priority policing level, the session border controller drops the received packet without decrypting said received packet. However, if the received packet passes the policing policy corresponding to the determined priority policing level the session border controller proceeds to decrypt said received packet.

In step 252, the session border controller performs authentication and decryption on the received packet. Step 252 includes step 253 and 254. In step 253 the session border controller decrypts the received packet to produce decrypted packet content. Operation proceeds from step 253 to step 254, in which the session border controller checks the decrypted packet content to determine if the received packet is a valid packet. Operation proceeds from step 252 to step 255.

If the received packet is a valid packet, as the received packet has passed the authentication and decryption of step 252, then operation proceeds from step 255 to step 256, in which the session border controller accepts the received packet; otherwise, operation proceeds from step 254, via connecting node B 232, to step 260 in which the session border controller drops said received packet.

Returning to step 256, operation proceeds from step 256 to step 257 in which the session border controller passes, e.g., sends, the packet. In some embodiments, passing the packet includes transmitting, e.g., forwarding, the received packet or forwarding content including in the received packet from the session border controller toward its intended destination. In some embodiments, the received packet undergoes further processing before the content of the received packet is transmitted from the session border controller toward its intended destination.

Operation proceeds from step 257 to step 258, in which the session border controller updates at least one of the next expected packet or a set of gap packet sequence numbers based on said packet sequence number of the accepted valid packet being passed.

Operation proceeds from step 258 or step 260, via connecting node F 262, to step 204, which the session border controller receives another packet including a packet sequence number for processing.

In some embodiments, the policing levels correspond to different policing levels of a multi-level bucket policer, at least some bandwidth being reserved for passing of packets corresponding to the lowest policing level, said lowest policing level, e.g., level 0, corresponding to the highest priority packets. In some embodiments, packets determined to correspond to the lowest policing level are given a higher probability of being passed with the probability of the packet being passed being a function of available bandwidth.

In an alternative implementation, a leaky-bucket policer is used. In various embodiments, the leaky-bucket policer provides the same effective priority mechanism or a similar prioritization mechanism as the multi-level bucket policer.

Various aspects and/or features in accordance with some embodiments are further discussed below. A novel window is described in flowchart 200 as an expected range of packet sequence numbers, the expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers. Thus the window described in flowchart 200, covers not just the most recent sequence numbers received (for replay detection) but includes the next set of sequence numbers expected. The next expected sequence number falls somewhere in the middle of the window. As expected packets are received, the window slides to the right.

The window need not be a logical construct. Implementation-wise, there is no need to maintain individual slots for sequence numbers beyond the next expected sequence number. Hence, while this is a "window" in the sense of having a left edge (to the left of the next expected sequence number) and a right edge (to the right of the next expected sequence number), the right edge may be defined as an offset from the next expected sequence number.

The operation of the system is as follows. When an sRTP/sRTCP packet arrives, the associated context is first located, e.g., in step 206. In some embodiments, the destination IP address, the VLAN tag, and the UDP port number together identify the context. However, any additional parameters available in the received packet can be, and in some embodiments, are included, and used in step 206. In particular, the context determination often also includes the source IP address and source port number.

In some embodiments, a packet is further subjected to one or more reasonableness checks, e.g., a timestamp field value and/or a SSRC field value reasonableness check, e.g., in step 290. If one of the reasonableness checks to which the packet is subjected to in step 290 fails, then the packet is dropped. However, if the packet passes the reasonableness test or tests to which it is subjected in step 290, then operation proceeds to step 208 and step 210. Thus in some embodiments, a received packet is screened via one or more reasonableness tests, and a packet which passes reasonableness is forwarded to a policer, while a packet which fails reasonableness is dropped.

In some embodiments, optional steps 290 and 292 are not performed and operation proceeds from step 206 to steps 208 and step 210.

With the context in hand, the packet can be classified into one of the following buckets based on the (implicit or explicit) sequence number of the packet, determined in step 210, and the sequence window, e.g., the window corresponding to expected range of packet sequence number of step 208, in the context:

1. The packet is the next one expected.
2. The packet is older than the next one expected but is within the window.
3. The packet is ahead of the next one expected but is within the window.
4. The packet is outside of the window.

The classification then drives the rate limiting of the packet, as indicated in step 214. For classification #1, these packets are policed at Priority 0 (the highest priority). For classification #2, if the packet sequence number was previously accepted (and marked in the window as such), the packets are considered replay packets and dropped. Otherwise, they are "gap" packets (i.e. packets we were expecting recently but didn't receive) and policed at Priority 0 (same as the next expected packet). For classification #3, the packets are considered potentially valid forward jumps and are policed at Priority 1 (the middle priority). Finally, for classification #4, the packets are considered highly suspect (but not guaranteed bad) and are policed at Priority 2 (the lowest priority).

Figure 3:
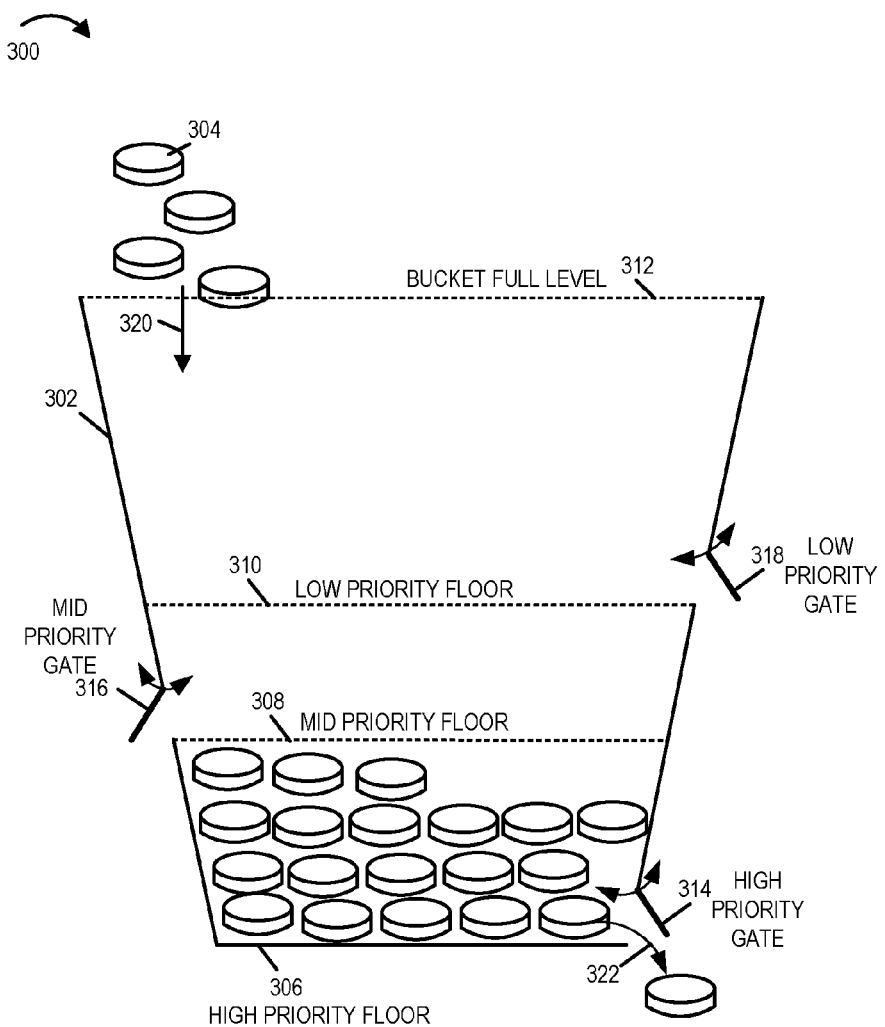
FIG. 3 is a drawing used to illustrate multi-level bucket token based policing in accordance with an exemplary embodiment.

In some embodiments, the policing is done using a per-stream multi-level token bucket policer. The policer performs one of steps 240, 242 and 244 on the received packet, corresponding to the assigned policing level. Exemplary operation of an exemplary policer is summarized with regard to drawing 300 FIG. 3.

The token bucket 302 comprises three separate "floors" and has a bucket full level 312. The high priority floor 306 is the bottom of the bucket 302, the middle priority floor 308 is slightly higher than the bucket bottom 306, and the low priority floor 310 is higher still. In some embodiments, the bucket 302 is filled with tokens 304 at a constant rate 320. To determine whether a packet should be passed or dropped, the appropriate door, high priority gate 314, mid priority gate 316, or low priority gate 310, is opened. For Priority 0 policing, if there is at least one token in the bucket 302, then the token is removed, via the high priority gate 314, and the packet passed. For Priority 1 policing, if there is at least one token above the mid-priority floor 308, then the token is removed, via the mid priority gate 316, and the packet passed. Equivalently, for Priority 2 policing, if there is at least one token above the low-priority floor 310, then the token is removed, via the low priority gate 318, and the packet passed. Otherwise, the packet is dropped.

If the packet is passed by the policer at the relevant level, then the packet, in some embodiments, next proceeds to the authentication and decryption module, and authentication and decryption is performed in step 252. In various embodiments, the authentication and decryption performed in step 252 is standard sRTP/sRTCP authentication and decryption. If the packet passes authentication and/or decryption in step 252, then it is valid and the sequence window may be, and sometimes is, advanced in step 258, e.g., the next expected packet sequence number changes and the expected range of packet sequence numbers (the window) changes. Note that the window may be advanced by more than one if the validated packet is ahead of the next expected sequence number.

Let's consider the behavior of an exemplary SBC, implemented in accordance with the present invention, under various usage scenarios. First, consider the normal use case, i.e. no attack traffic and behaving valid peers. Each sRTP stream has a context, a sequence window, and a priority policer as described above. The policer fill rate is set to the expected packet rate for the selected codec and packetization time plus, in our implementation, a 25% to 50% overage. The peer is a behaving peer so it sends sRTP packets at the expected rate and in the expected order. Consequently, the classifier matches each packet as type #1. Furthermore, the fill rate is higher than the actual rate (because the peer is sending at the expected rate) so the bucket is usually full. Hence, all the received packets will be policed at the highest priority (due to the Type #1 classification) and all the packets will be passed to the authenticator/decryptor (because the bucket will be generally full).

Similar processing applies to received sRTCP packets. In some embodiments, both sRTP and sRTCP packets pass through the same policer. In some embodiments, sRTP packets pass through a different policer than the policer used for sRTCP packets.

Next, let's add in attack traffic. For ease of explanation, we focus on any particular sRTP stream, but the general logic holds across all sRTP streams being handled by the SBC. Assume that the valid peer is sending sRTP exactly as expected, i.e. packets in order and at the expected rate. As such, these packets will be classified as Type #1 and policed with Priority 0. Also assume that an attacker is sending bogus packets, which match this context, at a much higher rate. If the attacker is blind (has not seen the valid stream), then their packets will be randomly distributed across the sequence space and with very high probability, these packets will be classified as either Type #2, Type #3, or Type #4 packets. (Most will be Type #4.) Since these will be either dropped, policed at Priority 1, or policed at Priority 2, these attack packets cannot affect the legitimate packets. The authenticator/decryptor will receive at most 1.5 times the expected packet rate comprising of all the expected packets and the remaining 0.5 in bad packets. Assuming that the authenticator/decryptor can process 1.5 times the expected rate (per stream), such an attack cannot affect the legitimate traffic.

There are several other combinations of attack streams and legitimate streams that the invention is resilient to. First, realize that it is legitimate for the sequence number to "jump". Though unusual, such a jump should not be disallowed. The invention handles this by policing, rather than dropping, packets which are ahead of the expected sequence number, and also packets which are beyond the expected window. (The latter is more unusual and hence policed more stringently.) Second, it is possible for legitimate packets to arrive out of order. This would be seen as a small skip ahead followed by the missing packets. Again, this is facilitated by the invention which will accept the skip ahead, and then accept the missing packets because they fit in the window but have not been marked as received yet. Third, consider the case where the attacker sees the stream and can copy the sequence number. For this case, the attack packet will almost certainly arrive after the legitimate packet (it takes time to see the legitimate packet, copy the sequence number, and then send the attack packet). In this case, the normal case replay prevention will drop the attack packet. A more nuanced case is when the attacker does this but advances the sequence number a few in anticipation of the upcoming legitimate packets. In this case, the attack packets would be classified as Type #3 and policed at Priority 1. They would then be processed by the authenticator/decryptor and discarded, i.e. without updating the sequence window. Consequently, when the valid packets arrive, they will still be the expected next packets and will be classified as Type #1 and policed at Priority 0. Again, the attack traffic cannot affect the legitimate traffic.

Various embodiments of the present invention are described for sRTP and sRTCP. However, various embodiments of the invention may be, and sometimes are used with other protocols, e.g., other protocols including encryption in which the packet sequence number is in the clear, i.e. available without having to do the decryption.

Figure 4:
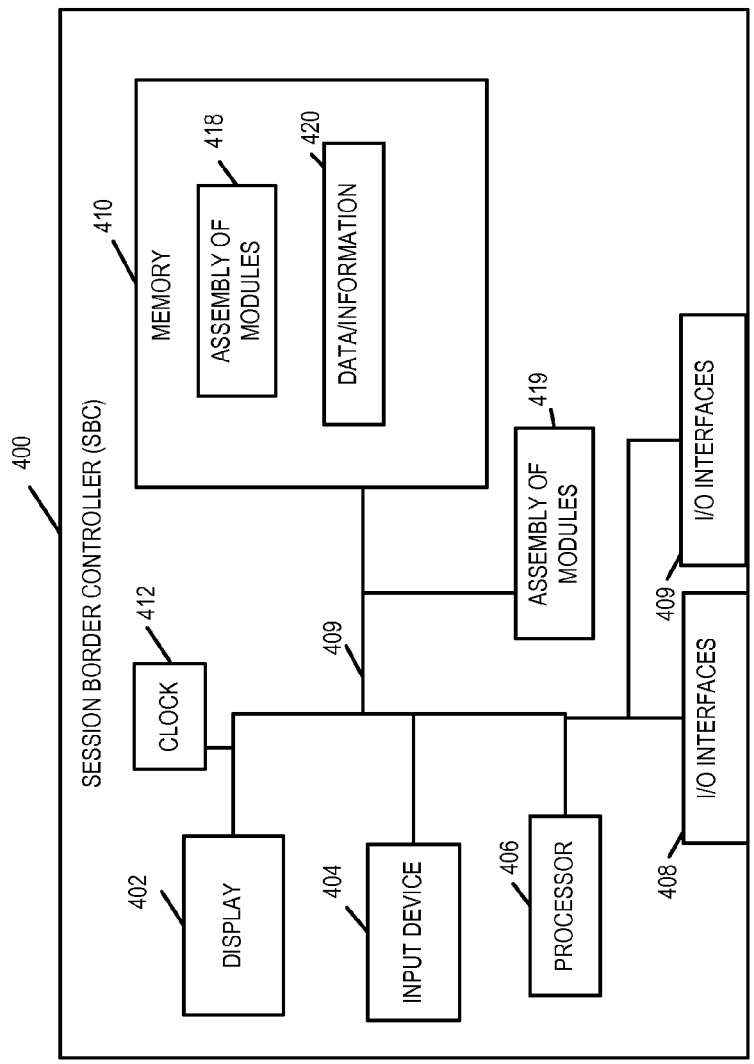
FIG. 4 is a drawing of an exemplary session border controller (SBC), implemented in accordance with an exemplary embodiment.

FIG. 4 is a drawing of an exemplary session border controller (SBC) implemented in accordance with an exemplary embodiment. Exemplary session border controller 400 includes a display 402, an input device 404, a processor 406, e.g., a CPU, I/O interfaces 408, which couple the SBC to various devices including host endpoints, I/O interfaces 409, which couple the SBC to a core network, memory 410, a clock 412, and an assembly of modules 419, e.g., circuits corresponding to different modules, coupled together via a bus 409 over which the various elements may interchange data and information. Memory 410 includes an assembly of assembly of modules 418, e.g., an assembly of software modules, and data/information 420. The clock 412 is used for timing related operation including, e.g., in performing a reasonableness test on a timestamp field value in a received packet being processed.

Figure 5A:
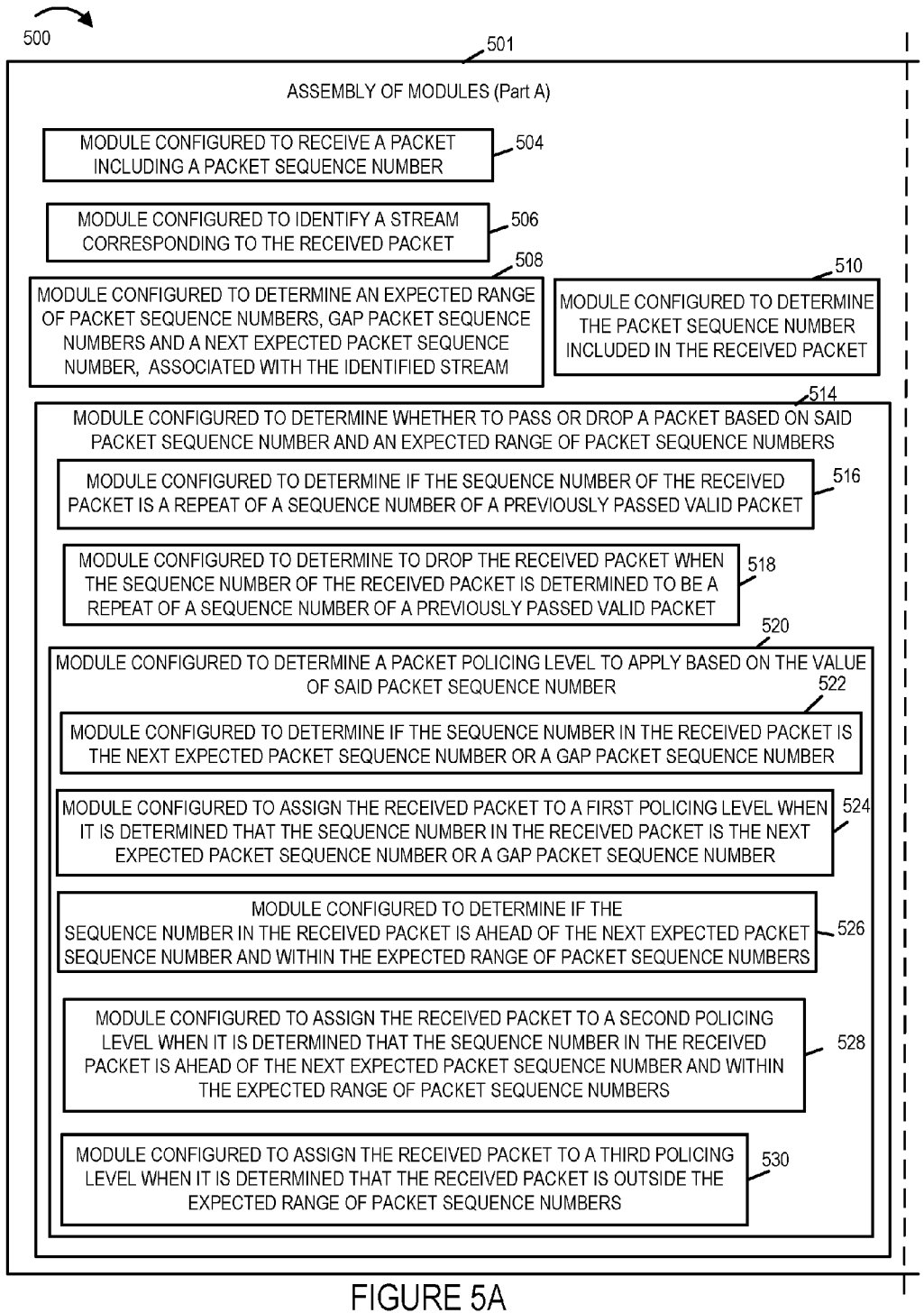
FIG. 5A is a drawing of a first part of an exemplary assembly of modules which may be included in the session border controller of FIG. 4.
Figure 5B:
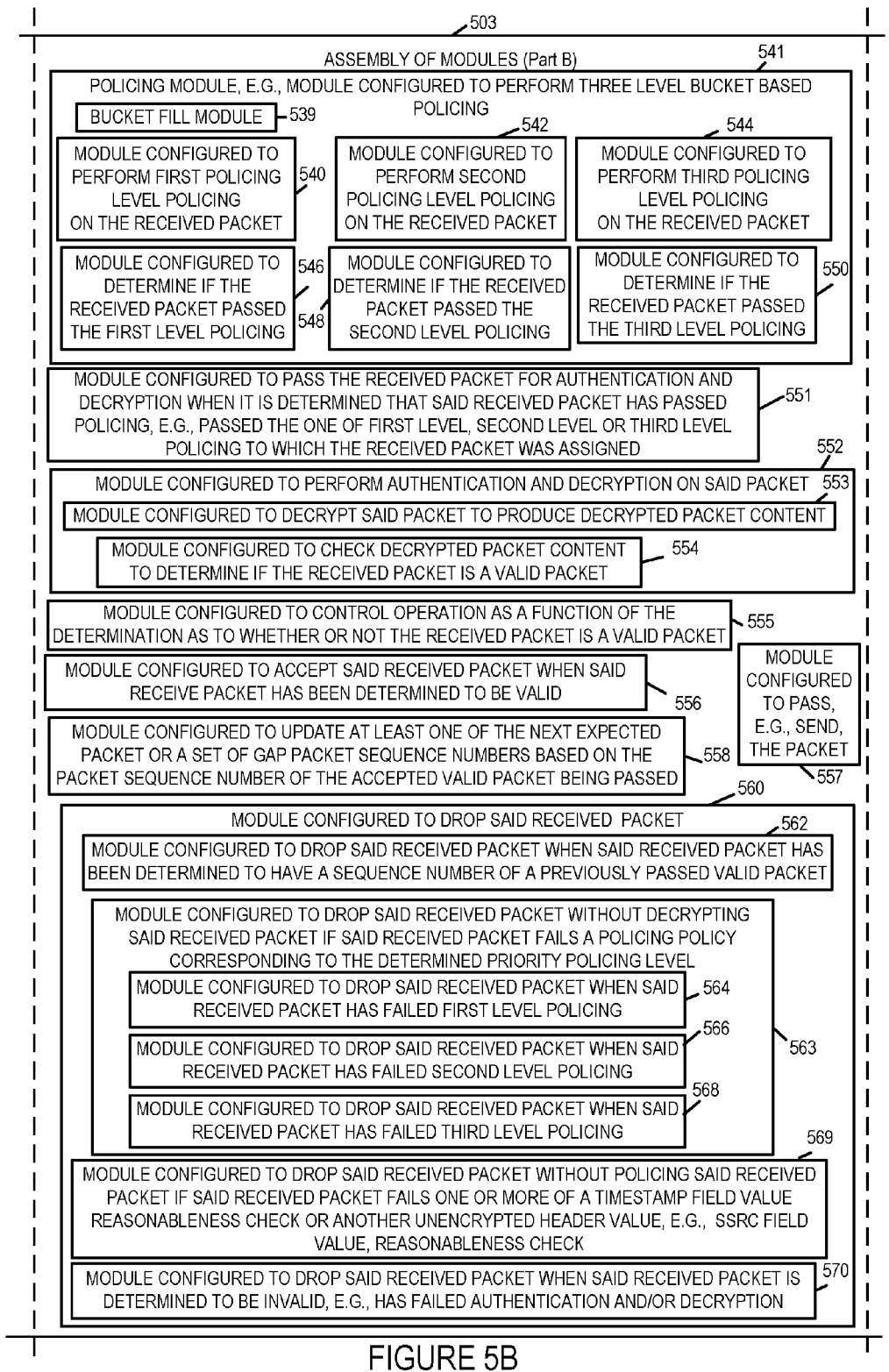
FIG. 5B is a drawing of a second part of an exemplary assembly of modules which may be included in the session border controller of FIG. 4.
Figures 5, 5C:
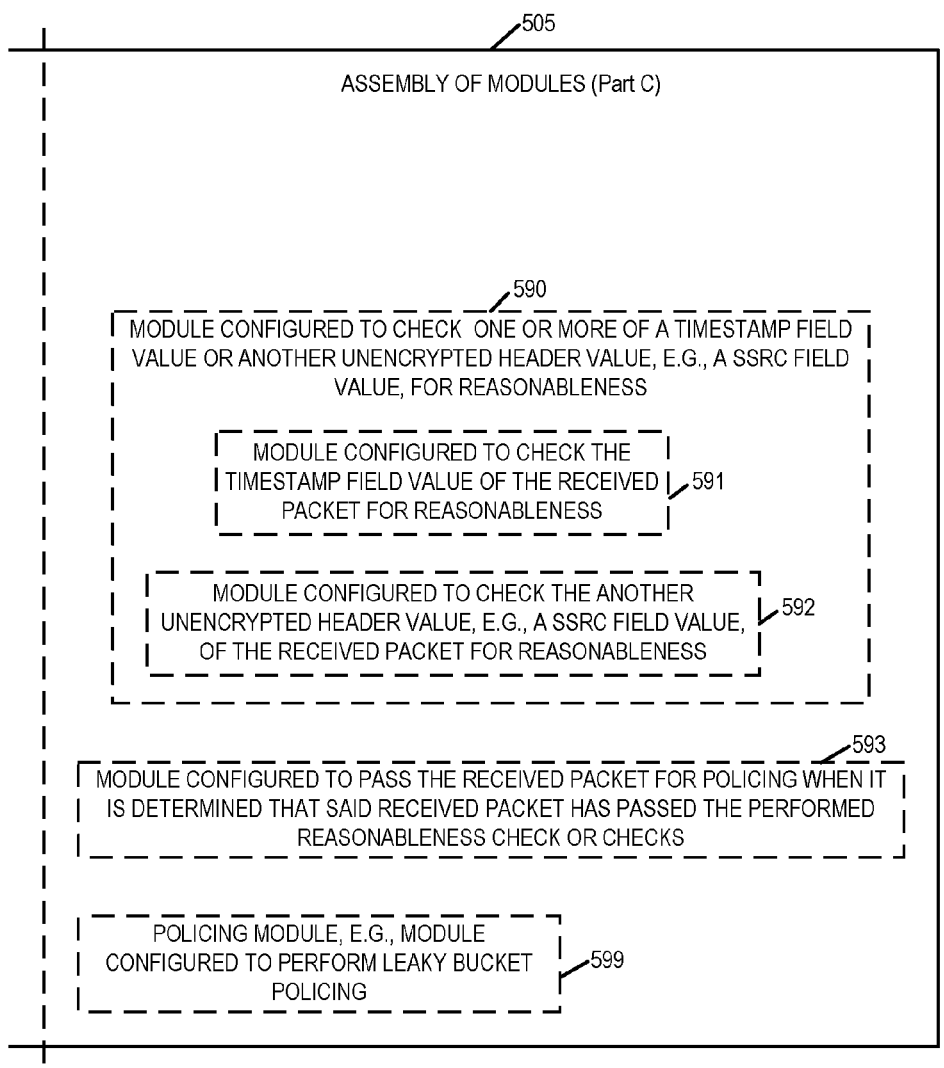
FIG. 5C is a drawing of a third part of an exemplary assembly of modules which may be included in the session border controller of FIG. 4.

FIG. 5 illustrates an assembly of modules 500 which can, and in some embodiments is, used in the SBC 400 illustrated in FIG. 4. The modules in the assembly of modules 500 can, and in some embodiments are, implemented fully in hardware within the processor 506, e.g., as individual circuits. The modules in the assembly of modules 500 can, and in some embodiments are, implemented fully in hardware within the assembly of modules 419, e.g., as individual circuits corresponding to the different modules. In other embodiments some of the modules are implemented, e.g., as circuits, within the processor 506 with other modules being implemented, e.g., as circuits within assembly of modules 419, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 510 of the SBC 400, with the modules controlling operation of SBC 400 to implement the functions corresponding to the modules when the modules are executed by a processor, e.g., processor 506. In some such embodiments, the assembly of modules 500 is included in the memory 410 as assembly of modules 418. In still other embodiments, various modules in assembly of modules 500 are implemented as a combination of hardware and software, e.g., with another circuit external to the processor providing input to the processor 506 which then under software control operates to perform a portion of a module's function. While shown in the FIG. 4 embodiment as a single processor, e.g., computer, it should be appreciated that the processor 406 may be implemented as one or more processors, e.g., computers.

When implemented in software the modules include code, which when executed by the processor 406, configure the processor 406 to implement the function corresponding to the module. In embodiments where the assembly of modules 500 is stored in the memory 510, the memory 510 is a computer program product comprising a computer readable medium comprising code, e.g., individual code for each module, for causing at least one computer, e.g., processor 506, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the SBC 400 or elements therein such as the processor 406, to perform the functions of the corresponding steps illustrated in the method flowchart 200 of FIG. 2. Thus the assembly of modules 500 includes various modules that perform functions of the corresponding steps of the method shown in FIG. 2.

FIG. 5, comprising the combination of FIG. 5A, FIG. 5B and FIG. 5C, is an assembly of modules 500, including Part A 501, Part B 503 and Part C 503, which may be included in an exemplary session border controller, e.g., session border controller 400 of FIG. 4, in accordance with an exemplary embodiment, Assembly of modules 500 includes a module 504 configured to receive a packet including a packet sequence number, a module 506 configured to identify a stream corresponding to the received packet, a module 508 configured to determine: an expected range of packet sequence numbers, gap packet sequence numbers, and a next expected packet sequence number, associated with the identified stream, and a module 510 configured to determine the packet sequence number included in the received packet.

Assembly of modules 500 further includes a module 514 configured to determine whether to pass or drop a packet based on said packet sequence numbers and an expected range of packet sequence numbers, the expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers. In some embodiments, the expected range of packet sequence numbers is, e.g., a range of numbers corresponding to a window centered or defined by the next expected packet sequence number. Module 514 includes a module 516 configured to determine if the sequence number of the received packet is a repeat of a sequence number of a previously passed valid packet, a module 518 configured to determine to drop the received packet when the sequence number of the received packet is determined to be a repeat of a sequence number of a previously passed valid packet, and a module 520 configured to determine a packet policing level to apply based on the value of said packet sequence number. Module 520 includes a module 522 configured to determine if the sequence number in the received packet is the next expected packet sequence number or a gap packet sequence number, said gap packet sequence number being a packet sequence number within the range of expected packet sequence numbers for which a valid packet has not yet been passed, said gap packet sequence number being behind, e.g., preceding, said next expected packet sequence number, a module 524 configured to assign the received packet to a first policing level when it is determined that the sequence number in the received packet is the next expected packet sequence number or a gap packet sequence number, a module 526 configured to determine if the sequence number in the received packet is ahead of the next expected packet sequence number and within the expected range of packet sequence numbers, a module 528 configured to assign the received packet to a second policing level when it is determined the sequence number in the received packet is ahead of the next expected packet sequence number and within the expected range of packet sequence numbers, and a module 530 configured to assign the received packet to a third policing level, when it is determined that the received packet is outside the expected range of packet sequence numbers. In one exemplary embodiment, first level policing is referred to as level 0 policing; second level policing is referred to as level 1 policing; and third level policing is referred to as level 2 policing. In some embodiments, the lowest level policing, e.g., level 0 policing, corresponds to Priority 0, the highest priority, and corresponds to the highest priority packets; the mid-level policing, e.g., level 1 policing, corresponds to Priority 1, the middle priority, and corresponds to medium priority packets; and the highest level policing, e.g., level 2 policing, corresponds to Priority 2, the lowest priority, and corresponds to the low priority packets.

Assembly of modules 500 further includes a policing module 541, e.g., a module configured to perform three level bucket based policing. Module 541 includes a bucket fill module 539, a module 540 configured to perform first policing level policing on the received packet, a module 542 configured to perform second policing level policing on the received packet, a module 544 configured to perform third policing level policing on the received packet, a module 546 configured to determine if the received packet passed the first level policing, a module 548 configured to determine if the received packet passed the second level policing, and a module 550 configured to determine if the received packet passed the third level policing.

Assembly of modules 500 further includes a module 551 configured to pass the received packet for authentication and decryption when it is determined that the received packet has passed policing, e.g., passed the one of first level, second level or third level policing to which the received packet was assigned, and a module 552 configured to perform authentication and decryption on said received packet. Module 552 includes a module 553 configured to decrypt said packet to produce decrypted packet content if said packet passes the policing policy corresponding to the determined priority level policing, and a module 554 configured to check the decrypted packet content to determined if the received packet is a valid packet.

Assembly of modules 500 further includes a module 555 configured to control operation as a function of the determination as to whether or not the received packet is a valid packet, a module 556 configured to accept said received packet when said received packet has been determined to be valid, and a module 557 configured to pass, e.g., send, the packet, when the packet has been determined to be valid. Assembly of modules 500 further includes a module 558 configured to update at least one of the next expected packet or a set of gap packet sequence numbers based on the packet sequence number of the accepted valid packet being passed.

Assembly of modules 500 further includes a module 560 configured to drop said received packet. Module 560 includes a module 562 configured to drop said received packet when said received packet has been determined to have a sequence number of a preciously passed valid packet, a module 563 configured to drop said received packet without decrypting said received packet if said received packet fails a policing policy corresponding to the determined policing policy, and a module 570 configured to drop said received packet when said received packet is determined to be invalid, e.g., has failed authentication and/or decryption. In some embodiments, module 560 includes a module 569 configured to drop said received packet without policing said received packet if said received packet fails one or more of a timestamp field value reasonableness check or another unencrypted header field value, e.g., a SSRC field value, reasonableness check. Module 563 includes a module 564 configured to drop said received packet when said received packet has failed first level policing, a module 566 configured to drop said received packet when said received packet has failed second level policing, and a module 568 configured to drop said received packet when said received packet has failed third level policing.

In some embodiments, said policing levels correspond to different policing levels of a multi-level bucket policer, at least some bandwidth being reserved for passing of packets corresponding to the lowest policing level, said lowest policing level, e.g., level 0, corresponding to the highest priority packets. In some embodiments, policing module 541 is a multi-level bucket policer. In various embodiments, packets determined to correspond to the lowest policing level are given a higher probability of being passed while packets determined to a higher policing level are given a lower probability of being passed with the probability of the packet being passed being a function of available bandwidth.

In some embodiments, assembly of modules 500 further includes one or more or all of: a module 590 configured to check one or more of a timestamp field value or another unencrypted header value, e.g., a SSRC field value, for reasonableness, and a module 593 configured to pass the packet for policing when it is determined that said received packet has passed the performed the reasonableness check or checks. Module 590 includes one or both of a module 591 configured to check the timestamp field value included in the received packet for reasonableness and a module 592 configured to check the another unencrypted header value, e.g., the SSRC field value, included in the received packet for reasonableness.

In some embodiments, assembly of modules 500 includes policer module 599, e.g., a module configured to perform leaky bucket policing.

Figure 6:
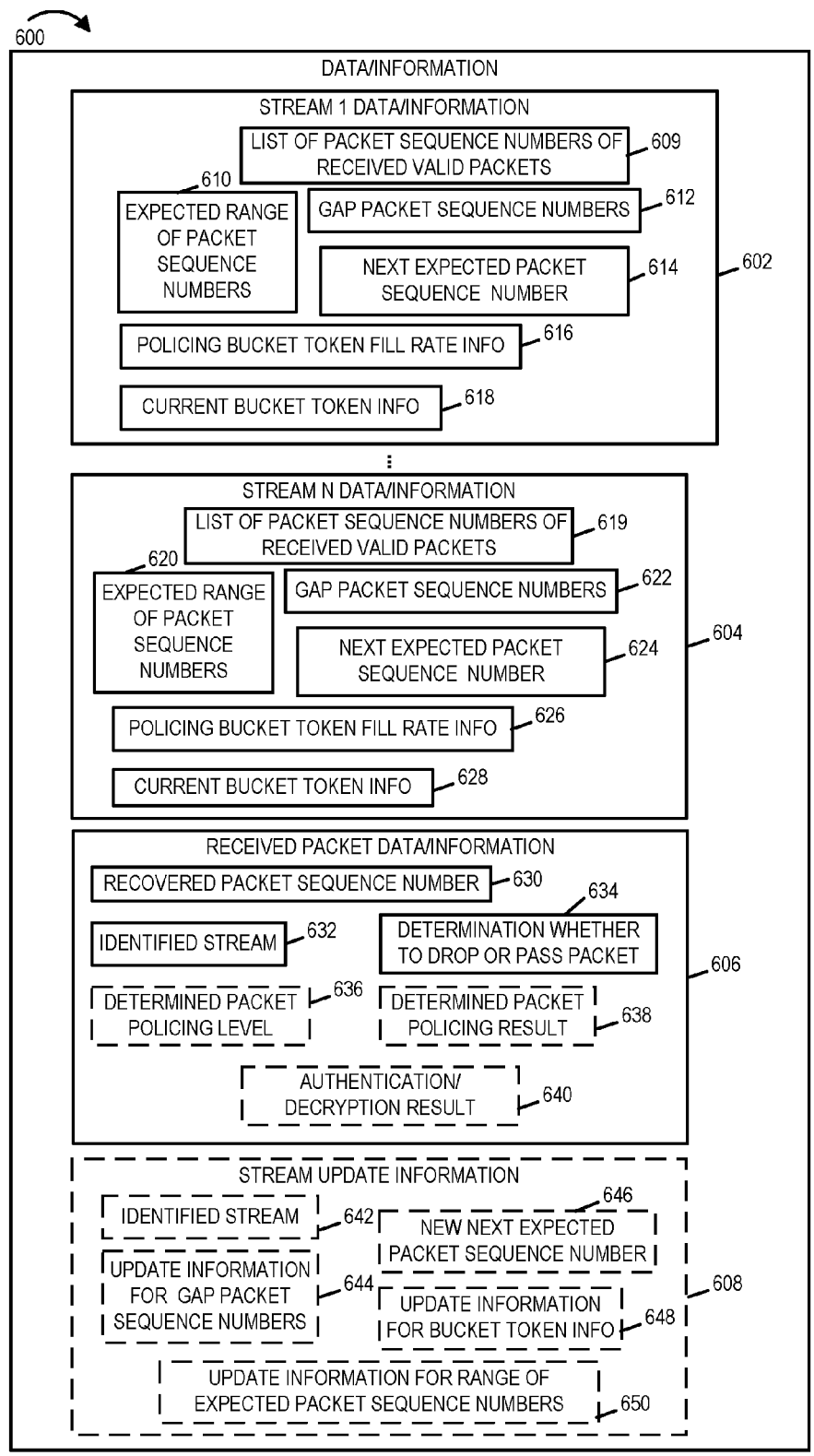
FIG. 6 is a drawing of exemplary data/information which may be included in the session border controller of FIG. 4.

FIG. 6 is a drawing of exemplary data/information 600, which may be included in exemplary data/information 420 of memory 410 of session border controller 400 of FIG. 4, in accordance with an exemplary embodiment.

Data/information 600 includes a plurality of set of sets of data/information corresponding to different streams (stream 1 data/information 602, . . . , stream N data/information 604), and received packet data/information 606. Data/information 600 may, and sometimes does, further include stream update information 608.

Stream 1 data/information 602 includes a list of packet sequence number of previously received valid packets 609, an expected range of packet sequence numbers 610, gap packet sequence numbers 612, a next expected packet sequence number 614, policing bucket fill rate information 616, and current bucket token information 618. The expected range of packet sequence numbers 610 defines a window.

Stream N data/information 604 includes a list of packet sequence numbers of previously received valid packets 619, an expected range of packet sequence numbers 620, gap packet sequence numbers 622, a next expected packet sequence number 624, policing bucket fill rate information 626, and current bucket token information 628.

Received packet data/information 606 includes a recovered packet sequence number 630, an identified stream 632, and a determination as to whether to drop or pass the received packet 634. Received packet data/information 606 may, and sometimes does, further include a determined packet policing level 636, a determined packet policing result 638, and an authentication/decryption result 640.

Stream update information 608 includes an identified stream 642, update information for gap packet sequence numbers 644, new next expected packet sequence number 646, update information for bucket token information 648, and update information for a range of expected packet sequence numbers 650.

Figure 7:
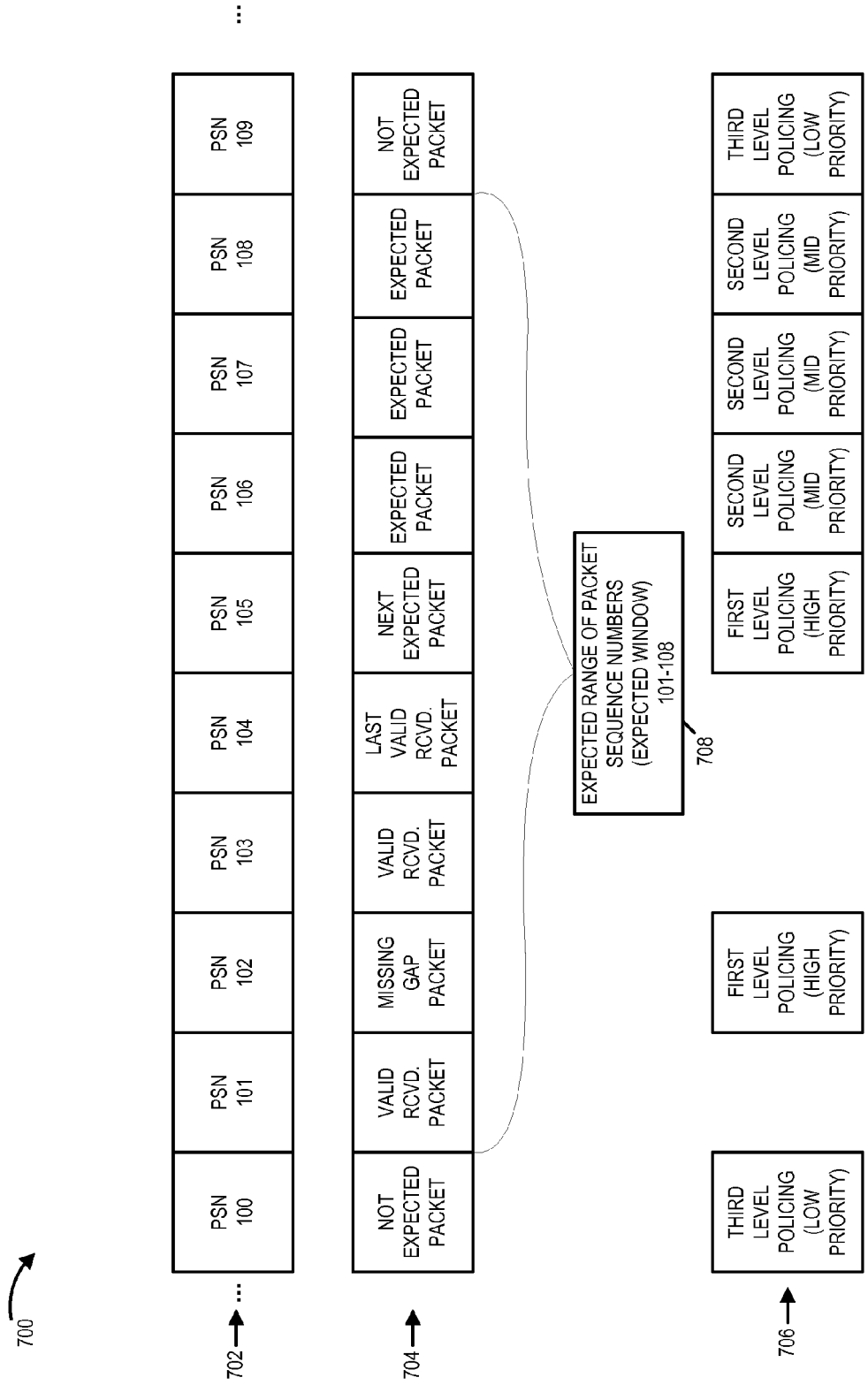
FIG. 7 is a drawing illustrating an example including exemplary packet sequence numbers corresponding to a stream in which packets are being received and processed by a SBC, an exemplary window, exemplary classifications of packet sequence numbers, and exemplary policing levels in accordance with an exemplary embodiment.

FIG. 7 is a drawing 700 illustrating an example including exemplary packet sequence numbers corresponding to a stream in which packets are being received and processed by a SBC, exemplary classifications of packet sequence numbers, and exemplary policing in accordance with an exemplary embodiment. Row 702 illustrates exemplary packet sequence numbers ( . . . , 100, 101, 102, 103, 104, 105, 106, 107, 108, 109, . . . ) corresponding to an exemplary data stream.

Box 708 indicates that the expected range of packet sequence numbers, e.g., the expected window for packet sequence numbers is 101-108. Row 704 indicates a classification corresponding to each of the packet sequence numbers. A packet with PSN=100 is not an expected packet and is outside the range of expected packet sequence numbers. A packet with PSN=101 has already been received and deemed a valid received packet. A packet with PSN=102 is a missing gap packet since a valid packet with the packet sequence number=102 has not been received, and the PSN=102 is within the expected range of packet sequence numbers (101-108) and below the next expected packet sequence number (105). A packet with PSN=103 has already been received as a valid received packet. A packet with PSN=104 has already been received as a valid received packet, is the highest packet sequence number of received valid packets and is classified as last valid received packet. The next expected packet is expected to have PSN 105. Packets with packet sequence numbers PSN=106, PSN=107, and PSN=108 are expected packets, which are in the expected range of packet sequence numbers (101-108), but above the value of the next expected packet. A packet with PSN=109 is not an expected packet and is outside the range of expected packet sequence numbers.

Row 706 lists the associated policing level which is applied to a received packet for each of the listed packets in the sequence number range (100 . . . 109) for this example. If the received packet has PSN=100, third level policing, e.g., low priority policing is performed. If the received packet has PSN=102, first level policing, e.g., high priority policing, is performed. If the received packet has PSN=105, first level policing, e.g., high priority policing, is performed. If the received packet has PSN=106, PSN=107 or PSN=108 second level policing, e.g., mid priority policing, is performed. If the received packet has PSN=109, third level policing, e.g., low priority policing is performed.

Various example scenarios will now be considered in accordance with the method of flowchart 200 of FIG. 2, each alternative scenario using FIG. 7 as the starting conditions.

In a first exemplary scenario, if the received packet includes packet sequence number=101 or 103 or 104, then the session border controller drops the received packet, since a valid packet with that sequence number has already been received.

In a second exemplary scenario, if the received packet includes PSN=102, the SBC processes the packet as a missing gap packet, assigns first level policing, which is high priority policing, to be performed. Consider that the received packet passes the first level policing. Further consider that the received packet passes authentication and decryption and is deemed a valid packet. The stored set of gap packet sequence numbers is updated, and PSN=102 is no longer classified as a gap packet sequence number, but is re-classified as a valid received packet. In this example, the set of gap packet sequence numbers is now a null set.

In a third exemplary scenario, if the received packet includes PSN=105, the SBC processes the packet as the next expected packet, assigns first level policing, which is high priority policing, to be performed. Consider that the received packet passes the first level policing. Further consider that the received packet passes authentication and decryption and is deemed a valid packet. PSN=105 is updated to be the last valid received packet; PSN=106 is updated to be next expected packet; and the expected range of packet sequence numbers is updated to 102-109.

In a fourth exemplary scenario, if the received packet includes PSN=106, the SBC processes the packet as an expected packet within the expected range of packet sequence numbers which is greater than the next expected packet sequence number, assigns second level policing, which is mid-priority policing, to be performed. Consider that the received packet passes the second level policing. Further consider that the received packet passes authentication and decryption and is deemed a valid packet. PSN=106 is updated to be the last valid received packet, PSN=107 is updated to be next expected packet, the expected range of packet sequence numbers is updated to 103-110, PSN=102 is reclassified as a not expected packet, and PSN=105 is updated to be a missing gap packet, PSN=109 is reclassified as an expected packet, and PSN=110 is reclassified from being a not expected packet to an expected packet.

In a fifth exemplary scenario, if the received packet includes PSN=109, the SBC processes the packet as a not expected packet, assigns third level policing, which is low priority policing, to be performed. Consider that the received packet passes the third level policing. Further consider that the received packet passes authentication and decryption and is deemed a valid packet. PSN=109 is updated to be the last valid received packet; PSN=110 is updated from being a not expected packet to being the next expected packet; the expected range of packet sequence numbers is updated to 106-113; PSN=102 is reclassified as a not expected packet; PSN=105 is updated to be a not expected packet; PSN=106 is reclassified as a gap packet, PSN=107 is reclassified as a gap packet; PSN=108 is reclassified as a gap packet; PSN=111 is reclassified from being a not expected packet to an expected packet; PSN=112 is reclassified from being a not expected packet to an expected packet; and PSN=113 is reclassified from being a not expected packet to an expected packet.

Figure 8:
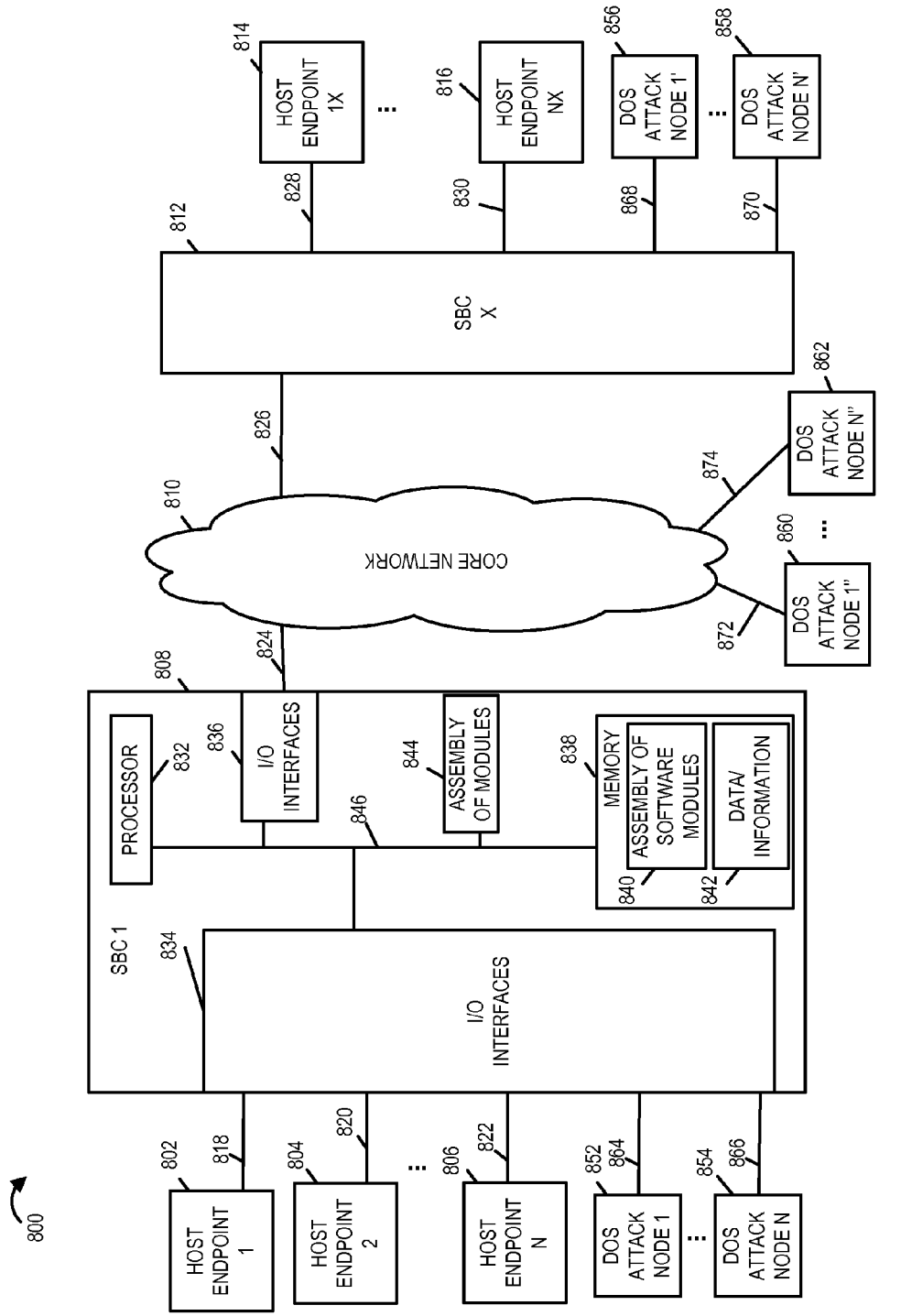
FIG. 8 is a drawing of an exemplary communications system including an exemplary session border controller implemented in accordance with an exemplary embodiment.

FIG. 8 illustrates an exemplary system 800 implemented in accordance with an exemplary embodiment of the invention. System 800 includes a plurality of host devices also referred to as end points (host end point 1 802, host end point 2 804, . . . , host end point N 806) which are coupled to a session border controller 1 (SBC 1) 808 through links (818, 820, . . . , 822) respectively. SBC 1 808 is coupled to a core network 810 via link 824. System 800 further includes a second session border controller, SBC X 812, which is coupled to the core network via link 826. SBC X 812 is also coupled to a plurality of host device end points (host endpoint 1X 814, . . . , host endpoint NX 816) via links (828, . . . , 830), respectively. SBC X 812 is coupled to the core network 810 via link 826. The core network 808 may include one or more network elements. The session border controllers SBC 1 808 and SBC X 812 are packet-oriented networking equipment which process packet flows, e.g., packets flows including, e.g., RTP packet flows, RTCP packet flows, sRTP packet flows, and sRTCP flows. The SBCs (808, . . . , 812) in system 800, which are implemented in accordance with various features of the present invent, are DOS attack resistant. The processing performed by the SBCs (808, . . . , 812) include filtering out and dropping received DOS attack packets.

The exemplary session border controllers (808, . . . , 812) included in system 100 implement a method in accordance with flowchart 200 of FIG. 2 and/or are implemented in accordance with exemplary SBC 400 of FIG. 4 and/or include modules in accordance with assembly of modules 500 of FIG. 5.

Exemplary session border controller SBC 1 802 includes a processor 832, Input/Output (I/O) interfaces 834, I/O Interfaces 836, memory 838, and assembly of modules 844 coupled together via bus 846 through which the various elements can communicate with one another. SBC 1 808 uses its Input/Output Interfaces (I/O Interfaces) 834 for communicating with host end points (host end point 1 802, host end point 2 804, . . . , host endpoint N 806) via communication links (818, 820, . . . , 822), respectively. SBC 1 808 uses I/O Interfaces 836 for communicating with the core network 810 via link 824. Assembly of modules 844 performs various operations. Processor 832, assembly of modules 844, memory 838 and I/O Interfaces 834 and 836 are coupled to communication bus 846 through which they can communicate. Memory 838 includes an assembly of software modules 840, e.g., routines, and data/information 842. Processor 832 may execute routines in assembly of software modules 840 and use data/information 842 to implement steps of an exemplary method.

In one exemplary embodiment, SBC 1 808 of FIG. 8 is SBC 400 of FIG. 4; I/O interfaces 834 are I/O interfaces 408; I/O interfaces 836 are I/O interfaces 409; processor 832 is processor 406; memory 838 is memory 410; assembly of modules 844 is assembly of modules 419; and assembly of software modules 840 is assembly of modules 418; data/information 842 is data/information 420.

System 800 may also includes a plurality of nodes ((DOS attack node 1 852, . . . , DOS attack node N 854), (DOS attack node 1' 856, . . . , DOS attack node N' 858), (DOS attack node 1" 860, . . . , DOS attack node N" 862) which may be used to perform DOS attacks, e.g., generate and send DOS attack packets. DOS attack nodes (node 1 852, . . . , DOS attack node N 854) are coupled to I/O interfaces 834 of SBC 1 808 via links (864, . . . , 866), respectively. DOS attack nodes (node 1' 856, . . . , DOS attack node N' 858) are coupled to I/O interfaces of SBC X 812 via links (868, . . . , 870), respectively. DOS attack nodes (node 1" 860, . . . , DOS attack node N" 862) are coupled to core network 810 via links (872, . . . , 874), respectively.

The techniques of various embodiments may be implemented using software, hardware and/or a combination of software and hardware. Various embodiments are directed to apparatus, e.g., communications device such as a session border controllers, e.g., a session border controller, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller (SBC) including a processor configured to implement one, multiple or all of the steps of one or more methods of the invention.

In some embodiments, the processor or processors, e.g., CPUs, of one or more devices, e.g., of the communications device, e.g., session border controller, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, with a processor which includes a module corresponding to each of the steps of the various described methods performed by the device in which the processor is included. In some but not all embodiments an apparatus, e.g., a communications device, e.g., a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving a packet including a packet sequence number;
determining whether to pass or drop said packet based on said packet sequence number and an expected range of packet sequence numbers, said expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers; and wherein said determining whether to pass or drop said packet based on said packet sequence number and an expected range of packet sequence numbers includes:

determining a packet policing level to apply based on the value of said packet sequence number, said determining a packet policing level to apply including assigning the received packet to a first policing level when said sequence number is the next expected packet sequence number or a gap packet sequence number, said gap packet sequence number being a packet sequence number within said expected range of packet sequence numbers for which a packet has not yet been passed, said gap packet sequence number being behind said next expected packet sequence number; and determining to drop and dropping said packet if said sequence number is a repeat of a sequence number of a previously passed valid packet.

2. The method of claim 1, wherein determining a packet policing level to apply based on the value of said sequence number further includes:

assigning the received packet to a second policing level when said sequence number is ahead of said next expected sequence number and within said expected range of packet sequence numbers.

3. The method of claim 2, further comprising:

assigning the received packet to a third policing level when said sequence number is behind said next expected sequence number and outside said expected range of packet sequence numbers.

4. The method of claim 1, further comprising:

dropping said packet without decrypting said packet if said packet fails a policing policy corresponding to the determined priority policing level.

5. The method of claim 4, further comprising:

decrypting said packet if said packet passes the policing policy corresponding to the determined priority policing level to produce decrypted packet content.

6. The method of claim 5, further comprising:

checking the decrypted packet content to determine if said packet is a valid packet;

dropping the packet if it is determined that said decrypted packet is not a valid packet; and passing the packet if it is determined that said decrypted packet is a valid packet.

7. The method of claim 6, further comprising:

updating at least one of the next expected packet number or a set of gap packet sequence numbers based on said packet sequence number of the packet being passed.

8. A communications method, the method comprising:

receiving a packet including a packet sequence number;

determining whether to pass or drop said packet based on said packet sequence number and an expected range of packet sequence numbers, said expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers; and wherein determining whether to pass or drop said packet based on said sequence number and an expected range of packet sequence numbers includes determining a packet policing level to apply based on the value of said packet sequence number, said policing levels corresponding to different policing levels of a multi-level bucket policer, at least some bandwidth being reserved for passing of packets corresponding to the lowest policing level, said lowest policing level corresponding to the highest priority packets.

9. The method of claim 8, wherein packets determined to correspond to the lowest policing level are given a higher probability of being passed while packets determined to a higher policing level are given a lower probability of being passed with the probability of the packet being passed being a function of available bandwidth.

10. An apparatus including one or more processors configured to:

receive a packet including a packet sequence number;

determine whether to pass or drop said packet based on said packet sequence number and an expected range of packet sequence numbers, said expected range of packet sequence numbers including a next expected packet sequence number, at least a preceding packet sequence number and at least a subsequent packet sequence number, said preceding packet sequence number preceding said next expected packet sequence number in said expected range of packet sequence numbers, said subsequent packet sequence number following said next expected packet sequence number in said expected range of packet sequence numbers;

determine a packet policing level to apply based on the value of said packet sequence number;

assign the received packet to a first policing level when said sequence number is the next expected packet sequence number or a gap packet sequence number, said gap packet sequence number being a packet sequence number within said expected range of packet sequence numbers for which a packet has not yet been passed, said gap packet sequence number being behind said next expected packet sequence number; and drop said packet if said sequence number is a repeat of a sequence number of a previously passed valid packet.

11. The apparatus of claim 10, wherein said apparatus is a session border controller.

12. The apparatus of claim 10, wherein said one or more processors are further configured to assign the received packet to a second policing level when said sequence number is ahead of said next expected sequence number and within said expected range of packet sequence numbers.

13. The apparatus of claim 12, wherein said one or more processors are further configured to assign the received packet to a third policing level when said sequence number is outside said expected range of packet sequence numbers.

14. The apparatus of claim 10, wherein said one or more processors are further configured to drop said packet without decrypting said packet if said packet fails a policing policy corresponding to the determined priority policing level.

15. A computer program product for use in a session border controller, the computer program product comprising:

a non-transitory computer readable medium comprising:

code for controlling at least one computer to receive a packet including a packet sequence number;

code for controlling said at least one computer to determine whether to pass or drop said packet based on said packet sequence number and an expected range of packet sequence numbers, said expected range of packet sequence numbers including a next expected packet sequence number, at least a preceding packet sequence number and at least a subsequent packet sequence number, said preceding packet sequence number preceding said next expected packet sequence number in said expected range of packet sequence number, said subsequent packet sequence number following said next expected packet sequence number in said expected range of packet sequence numbers;

code for controlling said at least one computer to determine a packet policing level to apply based on the value of said packet sequence number;

code for controlling said at least one computer to assign the received packet to a first policing level when said sequence number is the next expected packet sequence number or a gap packet sequence number, said gap packet sequence number being a packet sequence number within said expected range of packet sequence numbers for which a packet has not yet been passed, said gap packet sequence number being behind said next expected packet sequence number; and code for controlling at least one computer to drop said packet if said sequence number is a repeat of a sequence number of a previously passed valid packet.

\* \* \* \* \*